(No Model.)
L. W. WOOD.
NOSE RING.
No. 386,517. Patented July 24, 1888.
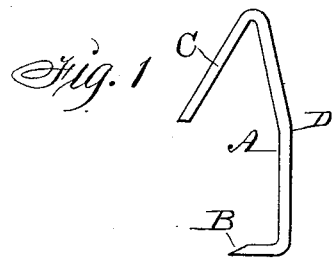
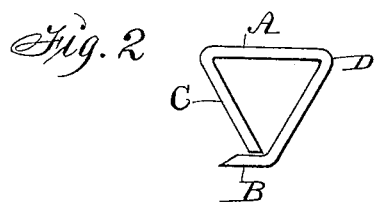
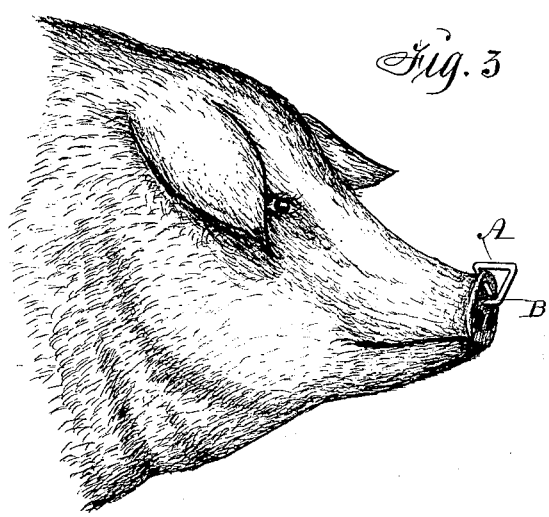
Witnesses:
R. H. Orwig.
M. P. Smith.
Inventor:
Leander W. Wood,
By Thomas G. Orwig, Atty.

UNITED STATES PATENT OFFICE.

LEANDER W. WOOD, OF FONTANELLE, IOWA.

NOSE-RING.

SPECIFICATION forming part of Letters Patent No. 386,517, dated July 24, 1888.

Application filed April 16, 1888. Serial No. 270,804. (No model.)

*To all whom it may concern:*

Be it known that I, LEANDER W. WOOD, a citizen of the United States of America, and a resident of Fontanelle, in the county of Adair and State of Iowa, have invented a new and useful Improvement in Nose-Rings for Hogs, of which the following is a specification.

Heretofore a piece of wire has been cut off diagonally at its ends, and the end portions bent toward each other in such a manner that one of the ends could be passed through the cartilage of a hog's snout, and the central portion then bent so as to bring the two ends together to produce a triangular-shaped closed ring that would project forward from the hog's nose, for the purpose of preventing the animal from rooting in the ground. A piece of wire has also been cut off square at its ends, and one of the ends bent at right angles in such a manner that when the other end was passed through a hog's snout, and the piece then bent into a circle and closed ring, the end that projects at right angles would prevent the ring from slipping and turning and irritating the opening in the animal's nose by the passage of the joint and the contact of the edges of the ends with the flesh or cartilage.

My object is to provide a piece of wire adapted in shape to be inserted in a hog's nose, and then readily pressed into a triangular-shaped and closed ring that will have an integral barb projecting toward the nose in such a manner that when the animal attempts to root the barb will prick and prevent rooting more effectually than rings without pointed barbs.

My invention consists in the construction and application of a ring and barb, as hereinafter set forth, pointed out in my claim, and illustrated in the accompanying drawings, in which—

Figure 1 shows a piece of wire or open ring in readiness to be applied. Fig. 2 shows the ring closed, as required, when fastened to an animal's nose. Fig. 3 shows the ring applied to a hog's snout and in position as required for practical use.

A is a piece of wire cut off diagonally at its ends. It may vary in size as desired. One of the ends is bent at right angles to produce a pointed barb, B. The other end, C, is bent toward the barb in such a manner that it will project at an angle of about forty-five (45) degrees to produce a V shape and the two sides of an equilateral triangle. A bend, D, at the central portion of the wire facilitates the pressing of the end C toward the inner side and inner end of the barb B, as required to produce a closed triangular-shaped ring after the end C has been forced through the cartilage of a hog's nose.

To apply a ring thus constructed, I place the prepared open ring in a pinchers adapted to receive it, and then place the point of the end on the top of the animal's snout, and by means of the tool press it through the cartilage of the snout and bring the end thus inserted in contact with the inner side of the barb B, as required, to produce a closed triangular-shaped ring, securely fixed to the animal, with the free and sharp end of the barb pointed toward the sensitive flesh, as clearly shown in Fig. 3.

I am aware that nose-rings of triangular shape have been made of a single piece of wire and one end extended across the diameter of the ring, and pointed so it could be passed through a hog's snout, and then doubled back over the lower part of the ring; but my manner of forming a ring and barb complete in one piece, so that the barb will project at right angles from the corner of the ring, and toward the hog's snout when applied, is novel and greatly advantageous in accomplishing the results contemplated by ringing hogs.

I claim as my invention—

A nose-ring for hogs, composed of a single piece of wire bent into a triangular shape, and provided with a barb that projects from one corner outwardly, substantially as shown and described, for the purposes stated.

LEANDER W. WOOD.

Witnesses:
JAY SULLIVAN,
J. R. EARNEST.